United States Patent
Kadlubski

[11] Patent Number: 5,899,287
[45] Date of Patent: May 4, 1999

[54] PROTECTIVE COVER FOR MOTOR VEHICLE RADIATORS

[76] Inventor: Peter Kadlubski, 1044 Grand Ave., Long Beach, Calif. 90804

[21] Appl. No.: 08/720,194

[22] Filed: Sep. 25, 1996

[51] Int. Cl.$^6$ .................................................. B60K 11/04
[52] U.S. Cl. ........................................................ 180/68.6
[58] Field of Search .......................... 280/770; 180/68.6; 428/100, 102, 124, 130; 150/166

[56] References Cited

U.S. PATENT DOCUMENTS

| | | | |
|---|---|---|---|
| 3,888,327 | 6/1975 | Reece ..................................... | 180/688 |
| 4,953,909 | 9/1990 | Crane ..................................... | 280/770 |
| 5,290,618 | 3/1994 | Olson et al. ............................ | 280/770 |
| 5,664,825 | 9/1997 | Henke et al. ........................... | 280/770 |

*Primary Examiner*—Richard M. Camby
*Attorney, Agent, or Firm*—William L. Chapin

[57] ABSTRACT

A protective cover for use on motor vehicle radiators while the vehicle is being serviced, fits over a radiator to protect it from damage which might otherwise be caused by inadvertent impact of a tool or engine component being removed or replaced, and to protect hands and other body parts of service personnel from cuts resulting from contact with sharp heat exchanger core fins of the radiator, or burns resulting from contact with hot radiator components, comprises a flexible pad having a front section that is adapted to lie on and remain in place on the upper tank portion of a radiator, and a rear core section adapted to drape downwards from the front tank section, over the heat exchanger core section of a radiator. Transversely disposed, sealed tubular weight-containing pockets are provided near the front peripheral edge of the cover, to maintain the tank portion of the cover in place by the force of gravity. In the preferred embodiment, a transversely disposed, sealed tubular rib or lip, which may also contain weights, protrudes upwards from the upper surface of the pad, between the front tank section and rear core section of the cover. The lip defines a transversely disposed channel or tray section between it and the front weight pocket, the tray providing a convenient temporary storage area for tools and small parts, the weight pocket and lip preventing tools or parts from sliding or rolling off the tray.

16 Claims, 5 Drawing Sheets

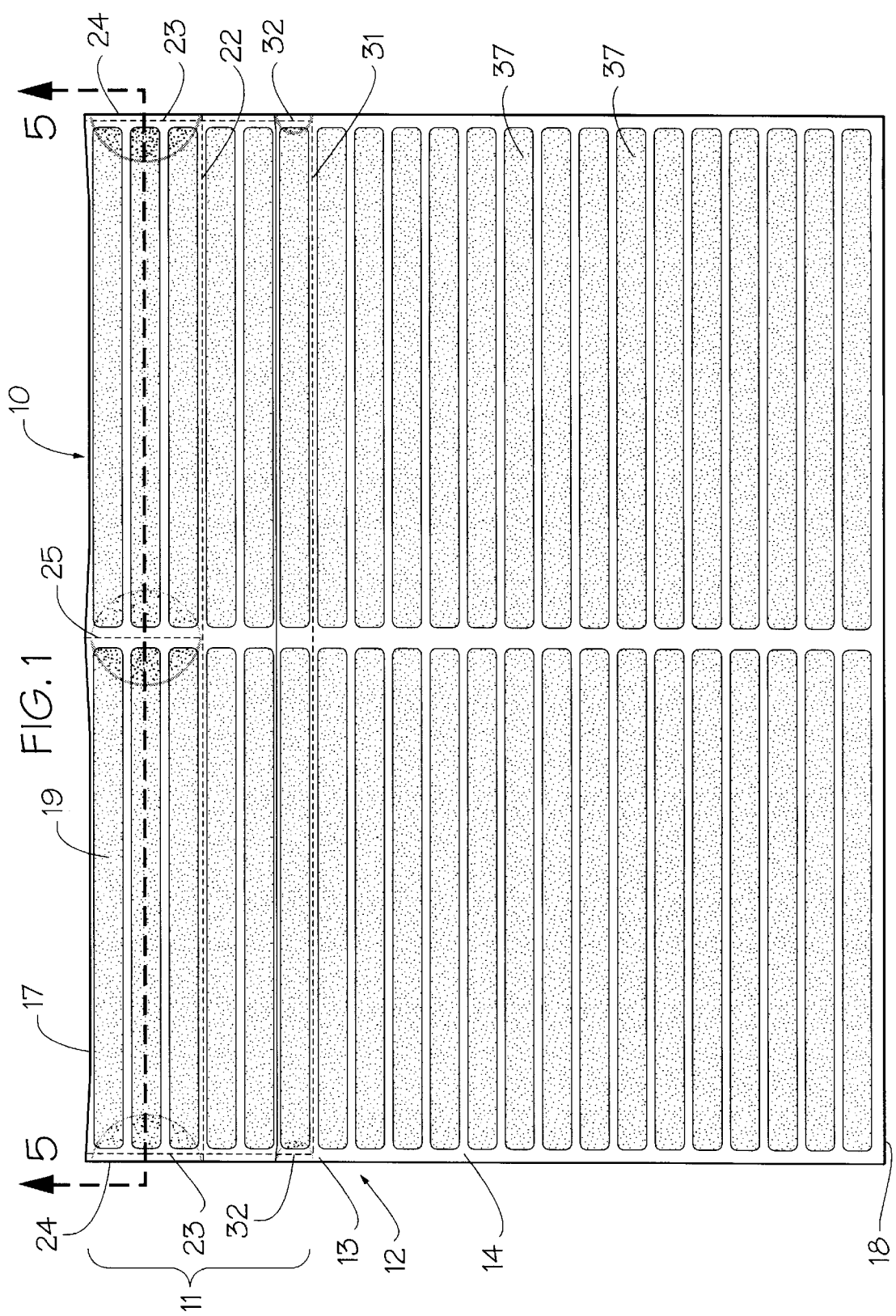

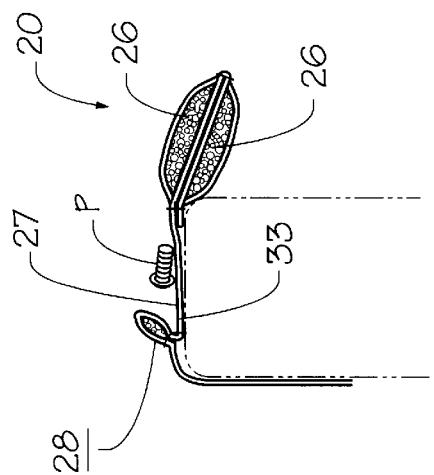
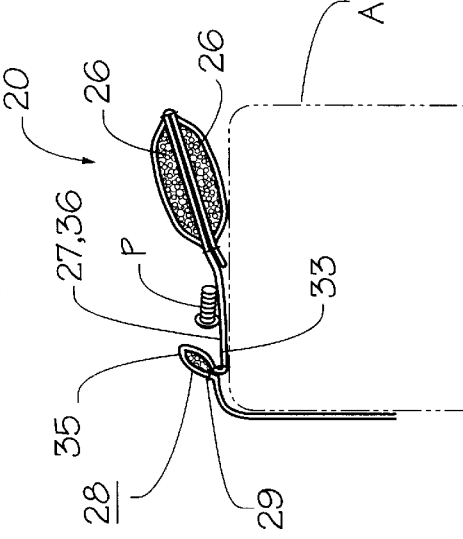
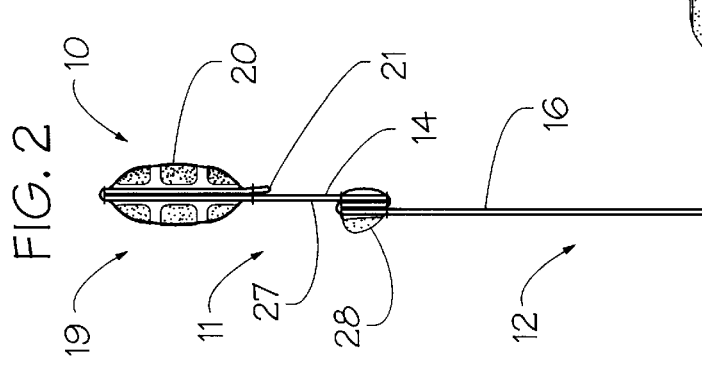
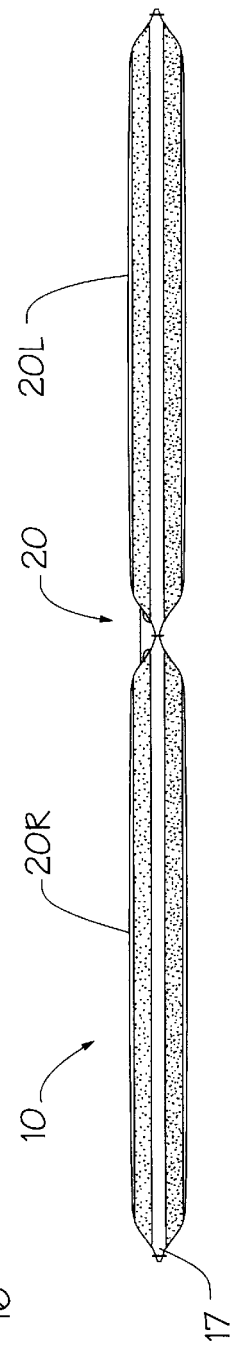
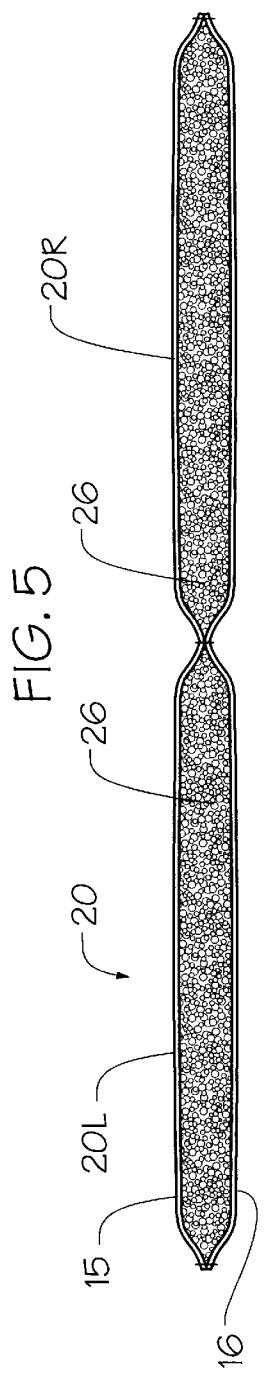

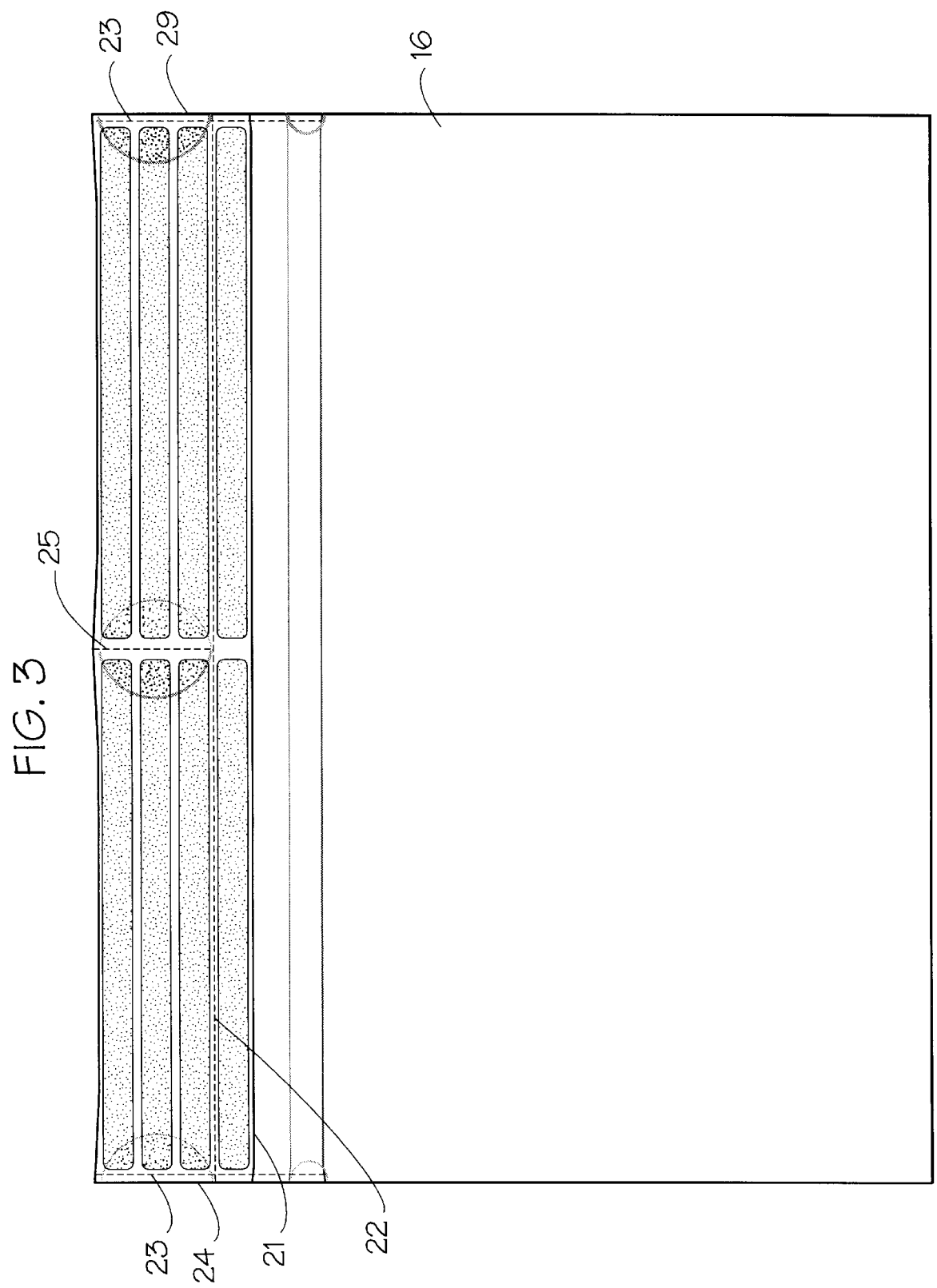

ly, the invention relates to a protective cover
PROTECTIVE COVER FOR MOTOR VEHICLE RADIATORS

BACKGROUND OF THE INVENTION

A. Field of the Invention

The present invention relates to articles for use in conjunction with the maintenance and repair of motor vehicles. More particularly, the invention relates to a protective cover that fits over the radiator of a motor vehicle while the vehicle is undergoing maintenance or repair, the cover protecting the radiator from damage, and the hands of service personnel from injuries.

B. Description of Background Art

It is well known to use protective covers placed over a fender of a motor vehicle while it is being serviced, to protect the finish of the vehicle from cosmetic damage by inadvertent impact of dropped or dragged tools. Representative of such protective covers are U.S. Pat. No. 3,298,712, Greenstadt, which discloses a fender pad made of a soft material that is readily drapable over an automobile fender, the pad containing a zipper pocket for holding tools.

Radke, U.S. Pat. No. 4,884,824, discloses a protective fender cover including in an upper marginal portion thereof means for securing the cover to a vehicle fender by frictional, mechanical and magnetic connections.

Olson, et al., U.S. Pat. No. 5,290,618, discloses an automobile fender protector that includes flexible terminal hooks at opposite ends of the upper margin of the protector to secure the protector to structural elements under the raised hood of the vehicle.

Gurbacki, U.S. Pat. No. 5,129,678, discloses a dirt and grease protective cover for the rear of an automobile, which is mounted in the trunk of a vehicle by hook and loop fasteners so that it may fold out and cover the rear of the automobile when loading or removing articles from the trunk, thereby protecting a person from coming into contact with a dirty automobile surface while loading and unloading the trunk.

Dismuke, U.S. Pat. No. 5,195,778, discloses a car utility apron having a central front section and two side sections which are draped over the front and fenders respectively, of an automobile with the hood raised, the apron being held in place by hooks at the top edge and an elastic band and another set of hooks at the bottom edge. The front of the apron has the upper half cut out and replaced with a "webbing" of open mesh material, allowing air to flow through the radiator if the engine is running while the apron is in place. The sides of the apron contain pockets for storing tools.

The protective covers cited in relevant prior art references above may serve their intended functions, of protecting fenders and other external portions of a vehicle while it is being serviced. However, the present inventor has identified another problem area in servicing motor vehicles, that motivated his development of a protective cover of substantially different structure and function from the protective covers disclosed in the prior art.

In performing routine maintenance, replacement or repair of engine components located in the engine compartment of a motor vehicle, the radiator of the vehicle is often problematic. Since the radiators of most modern vehicles utilize a heat exchanger core comprising a myriad of honeycomb cells made of sharp, thin, fragile aluminum or copper sheet metal, the radiators may be easily damaged by inadvertent impact by a wrench handle or other tool part. Such damage can necessitate costly and time consuming repairs. Moreover, radiator cores present a hazard to mechanics, the sharp heat exchanger fins being responsible for numerous cuts and hand injuries, when accidently contacted by a mechanic performing maintenance or repair near the radiator. Also, it is sometimes necessary to perform maintenance tasks on a vehicle while the radiator is still hot, resulting in the possibility of inflicting burns as well as cuts. Aside from the discomfort and inconvenience to the mechanic, such injuries are costly to vehicle repair facilities, because of down-time, medical and insurance expenses. In view of the potential for injuries to mechanics, and/or damage to the radiator of a motor vehicle by inadvertent contact with the radiator, the present invention was conceived of.

OBJECTS OF THE INVENTION

An object of the present invention is to provide a protective cover for radiators of motor vehicles, to be used when maintenance or repairs are being performed on vehicle components located near the radiator.

Another object of the invention is to provide a protective cover for vehicles that protects the radiator from impact damage while the vehicle is being serviced.

Another object of the invention is to provide a protective cover for vehicle radiators that protects the hands of maintenance personnel from being cut or burned by the radiator core.

Another object of the invention is to provide a protective cover for vehicle radiators that may be readily draped over a radiator and maintained in position without any external fastening means.

Another object of the invention is to provide a protective cover for a vehicle radiator that includes means for holding tools in a convenient position for subsequent use.

Another object of the invention is to provide a protective cover for vehicle radiators that includes an integral, shallow trough section defined by a raised ridge for preventing tools from sliding or rolling rearward into the engine compartment of a vehicle.

Another object of the invention is to provide a protective cover for vehicle radiators that includes padding that affords a comfortable resting surface for arms and elbows.

Various other objects and advantages of the present invention, and its most novel features, will become apparent to those skilled in the art by perusing the accompanying specifications, drawings and claims.

It is to be understood that although the invention disclosed herein is fully capable of achieving the objects and providing the advantages described, the characteristics of the invention described herein are merely illustrative of the preferred embodiment. Accordingly, I do not intend that the scope of my exclusive rights and privileges in the invention by limited to details of the embodiments described. I do intend that equivalents, adaptations and modifications of the invention reasonably inferable from the description contained herein be included within the scope of the invention as defined by the appended claims.

SUMMARY OF THE INVENTION

Briefly stated, the present invention comprehends a protective cover for radiators of motor vehicles. The cover is intended to protect radiators from damage, and to prevent injuries to hands of service personnel, specifically, burns or cuts caused by contacting sharp components of the radiator core, when maintenance or repairs are being performed on a motor vehicle.

The protective cover for vehicle radiators according to the present invention comprises essentially a flexible pad having a relatively long elongated rectangularly-shaped rear section adapted to drape over the rear of the core section of a radiator, and a relatively short front section that is adapted to lie over the upper, tank portion of the radiator. The front section of the cover has transversely disposed, sealed weight pockets near the front edge thereof, which are partially filled with movable beads. The beads provide weight which tends to hold the cover in position on the radiator, while the flexibility of the cover material, and movability of the beads within the pockets, allows the front section to conform to the irregular surface of the radiator tank. This pocket construction also provides a comfortable padded surface for the arms and elbows of a mechanic leaning over the radiator while working on vehicle components located near the radiator.

In the preferred embodiment, a transversely disposed flexible rib or lip protrudes upwards from the upper surface of the protective cover, the rib being located at the rear edge of the front portion of the cover and defining the boundary between the short, front tank cover portion and the longer, rear core cover portion. The rib defines a transversely disposed channel section between it and the bead-containing weight pockets. Tools may be conveniently placed on the channel section, the rib preventing the tools from rolling rearward off the channel section, and the weight pockets limiting forward movement of the tools.

BRIEF DESCRIPTION OF THE DRAWINGS

FIG. 1 is an upper plan view of a protective cover for motor vehicle radiators, according to the present invention.

FIG. 2 is a side elevation view of the cover of FIG. 1.

FIG. 3 is a lower plan view of the cover of FIG. 1.

FIG. 4 is a front elevation view of the cover of FIG. 1.

FIG. 5 is a fragmentary transverse sectional view of the cover of FIG. 1, taken along line 5—5.

FIG. 7 is a fragmentary longitudinal sectional view of the cover of FIG. 6, taken along line 7—7.

FIG. 9 is a fragmentary longitudinal sectional view of the cover of FIG. 8, taken along lines 9—9.

DETAILED DESCRIPTION OF THE PREFERRED EMBODIMENTS

Referring now to FIGS. 1–9, a protective cover for motor vehicle radiators according to the present invention is shown.

Figure 6:
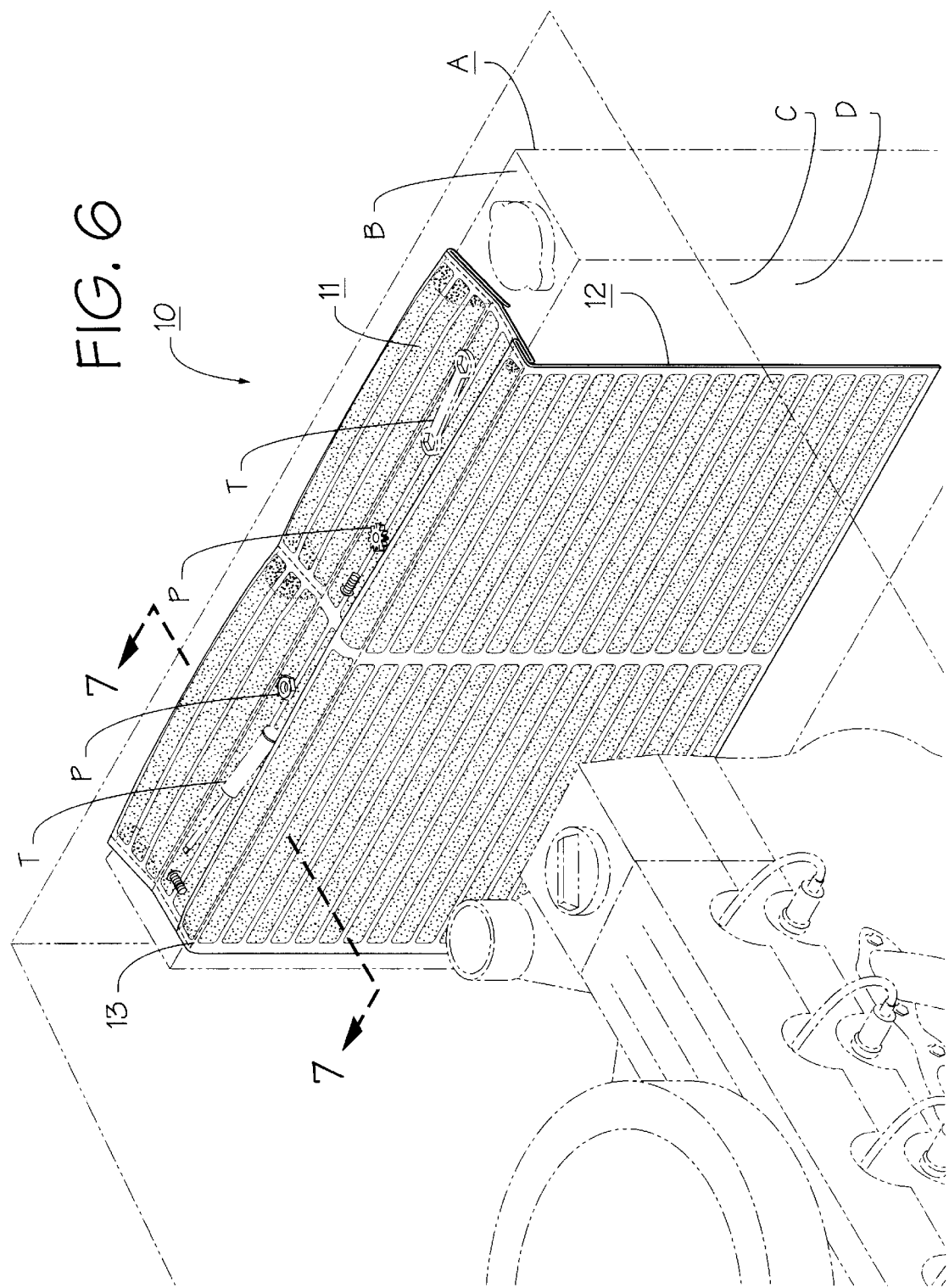
FIG. 6 is an upper perspective view of the cover of FIG. 1, showing the cover in place on the radiator of a motor vehicle.

As may be seen best by referring to FIGS. 1 and 6, protective cover 10 has the overall appearance of a rectangularly-shaped mat partitioned into a relatively short front transversely disposed "tank" section 11, and a relatively long rear "core" section 12. As will become clear from the ensuing discussion, the tank section is so named because it is intended to fit over the upper, coolant tank section of a motor vehicle radiator. Similarly, the core section is so named because it is designed to drape over the rear surface of the lower, heat exchanger core section of a motor vehicle radiator.

Protective cover 10 is preferably made from a thin, flexible material. This construction allows longer rear core section 12 to bend downwards along a transverse "hinge" line 13 from front section 11, and hang in contact with the rear surface of a radiator core. Thus, as shown in FIG. 6, front tank section 11 of protective cover 10 is placed on the tank B of a radiator A of a motor vehicle, while longer rear core section 12 hangs down rearward of the rear surface of core C of the radiator. Alternatively, front tank section 11 and rear core section 12 of protective cover 10 could be made of more rigid materials, and joined by a transversely disposed hinge member, which could be fabricated as a strip of thin, flexible material.

In the preferred embodiment of protective cover 10, the cover is made from a unitary sheet 14 of flexible vinyl material. As shown in FIG. 6, the flexibility of the vinyl material allows rear tank section 12 to bend freely along a "hinge" line 13 from front section 11. Although the exact thickness and composition of sheet 14 are not critical, the sheet must be sufficiently thick to prevent tool parts which might impact upper surface 15 of the sheet during the normal course of maintenance or repair procedures on a motor vehicle, from penetrating cover 10 sufficiently to damage radiator core C. Moreover, sheet 14 of protective cover 10 should have sufficiently good thermal insulation properties to prevent burns to human flesh contacting upper surface 15 of the cover while its rear surface 16 is in contact with a hot radiator core. The present inventor has found that fabricating protective cover 10 from an elastomeric polyvinyl chloride (PVC, or "vinyl") sheet 14 having a thickness of about 1.0 mm. satisfies both the tool impact resistance and thermal insulating requirements described above.

In the embodiment of protective cover 10 shown in FIGS. 1 through 9, the cover is fabricated from a single, unitary sheet 14 of vinyl material. As may be seen best by referring to FIG. 1, protective cover 10 has a rectangular plan view with a relatively short front transversely disposed tank section 11 bounded on the front edge thereof by the front marginal edge 17 of the cover, and at the rear edge thereof by a transversely disposed hinge line 13. Protective cover 10 includes a relatively long rectangularly-shaped rear core section 12 bounded on the front edge thereof by hinge line 13 and at the rear edge thereof by the rear marginal edge 18 of the cover. By way of example only, suitable overall dimensions for protective cover would be 22 inches long and 27 inches wide, the length dimension being partitioned into a 5-inch long front tank section, and a 17-inch long rear core section. Of course, some or all of these dimensions could be modified to suit vehicle radiators of different sizes.

As shown in FIGS. 1 and 2, front tank section 11 of protective cover 10 preferably includes a weighted section 19 that serves to maintain the tank section of the cover in position on the tank of radiator, by the force of gravity. Weighted section 19 preferably is fabricated as a tubular pocket 20 disposed transversely across the upper surface 14 of tank section 12, the pocket containing weights. As may be seen best by referring to FIGS. 2–7 in addition to FIG. 1, tubular weight pocket 20 is formed by folding the front transverse marginal edge 21 of sheet 14 underneath lower surface 16 of the sheet, and fastening the transverse marginal edge to the lower surface of sheet 14. As may be seen best by referring to FIG. 3, front transverse marginal edge 21 of sheet 14 is secured to lower surface 16 of sheet 14 by a sewn front transversely disposed seam 22 located inward a short distance from the front transverse marginal edge. As shown in FIGS. 1 and 3, front transverse seam 22 penetrates upper surface 15 of sheet 14, and spans the width of the sheet.

As shown in FIGS. 1 and 2, tubular weight pocket 20 is closed at each outer longitudinal edge thereof by a short longitudinally disposed seam 23 located a short distance inward from each of the two opposite longitudinal edges 24 of sheet 14. Preferably, weight pocket 20 is partitioned into left and right halves 20L and 20R by a third, central longitudinally disposed pocket seam 25, located midway between the outer longitudinal edges 24 of sheet 14, i.e., along the longitudinal center line of the sheet.

Referring now to FIGS. 5 and 6, left and right halves 20L and 20R of weight pocket 20 may be seen to be partially filled with beads 26 to add weight to the pockets. In an example embodiment, beads 26 were made of generally spherically-shaped plastic pellets having a diameter of about 1/8 inch. Movability of the pellets within pockets 20 formed in flexible sheet 14 allows resilient deformation of the pockets to conform to the contours of mechanics' arms and elbows. Thus, pockets 20 perform a comfort-affording function, as well as weighting function.

Referring again to FIGS. 1, 6 and 7, front tank section 11 of protective cover 10 may be seen to include a tool storage area or tray 27. Thus, as shown in those figures, protective cover 10 includes a transversely disposed rib or lip 28 that protrudes upwards from the upper surface of the cover. Lip 28 includes a tubular lip pocket 29 disposed transversely across the upper surface 15 of tank section 12. As may be seen best by referring to FIGS. 2 and 7 in addition to FIG. 1, tubular lip pocket 29 is fabricated by gathering sheet 14 upwards to form an upwardly protruding, transversely disposed looped section 30 and sealing the lower pinched margin of the looped section to form a transversely disposed tube. As shown in FIG. 1, "looped" section 30 is sealed by a transversely disposed, sewn seam 31. Seam 31 may span the width of sheet 14. As shown in FIG. 1, seam 31 may be coextensive with hinge line 13 defining the boundary between rear core section 12 and front tank section 11 of the protective cover.

Referring now to FIGS. 1 and 3, tubular lip pocket 29 is closed at each opposed longitudinal edge thereof by a short longitudinally disposed seam 32 located a short distance inward from each of the two opposite longitudinal edges 24 of sheet 14. With this construction, tubular lip pocket 29 is bent downwards towards the front edge of cover 10, thereby forming a forward facing depression 33. As shown in FIGS. 1 and 3, lip pocket seams 32 may be continuous with respective weight pocket seams 23.

As may be seen best by referring to FIG. 7, lip pocket 29 is partially filled with beads 34. Beads 34, which may be similar or identical to beads 26 used as ballast weight in pocket 20 and described above, serve to elevate the upper surface 35 of lip 28, thus forming a transversely elongated rectangularly-shaped channel or tray 36 between the lip and weight pocket. Thus disposed, tray 36 serves as a convenient storage area for tools T and parts P, as shown in FIGS. 6 and 7.

Referring now to FIG. 6, protective cover 10 according to the present invention is shown in use on the radiator A of a motor vehicle. As shown in FIG. 6, front tank portion 11 of protective cover 10 is positioned to lie substantially horizontally on the generally horizontally disposed upper wall of the upper or tank portion B of the radiator A. The resilience and drapability of vinyl sheet 14 from which cover 10 is fabricated allows the cover to conform readily to the irregular upper surface of radiator tank B. Also, the weight of left and right tubular weight pockets 20L and 20R maintains cover 10 in a fixed position relative to radiator A, even with rear core portion 12 of the cover draped vertically downwards to overlie rear surface D of radiator core C. Thus positioned, protective cover 10 protects both tank B and rear core surface D of radiator A from impact damage which might be caused by a dropped tool, or the handle of a wrench being orbited to loosen or tighten a threaded engine component or fastener. Also, with protective cover 10 positioned as shown in FIG. 6, service personnel are protected from burns which might be caused by contact with radiator tank B or core C when the radiator is still hot, and from cuts resulting from contact with the sharp metal fins which form part of the radiator core structure.

In the preferred embodiment of protective cover 10, upper surface 15 of the cover is provided with a plurality of laterally disposed, longitudinally spaced apart ribs 37. As shown in FIG. 2, ribs 37 protrude upward slightly from upper surface 15 of protective cover 10. Ribs 37 have an embossed, pitted, or otherwise roughened surface and function as friction enhancing members reducing the slipperiness of vinyl sheet 14 and thereby minimizing the likelihood that limbs of service personnel temporarily encountering the surface of protective cover 10 would unexpectedly slide on the surface and impact an object, possibly causing injuries.

As shown in FIG. 6, with protective cover 10 in place on radiator A, the downward draping of core section 12 from tank section 11, essentially along hinge line 13, causes lip 28 to protrude at a larger, more nearly vertical angle from tool channel section 36. Thus positioned, lip 28 prevents tools T from rolling rearwards off from protective mat 10. Moreover, depression 33 below lip 28 serves to capture small parts P which might otherwise roll rearward off upper surface 15 of protective cover 10. Tubular weight holder pocket 20 performs a function similar to that of lip 28, presenting a barrier to tools or parts sliding or rolling forward off of protective cover 10.

Figure 8:
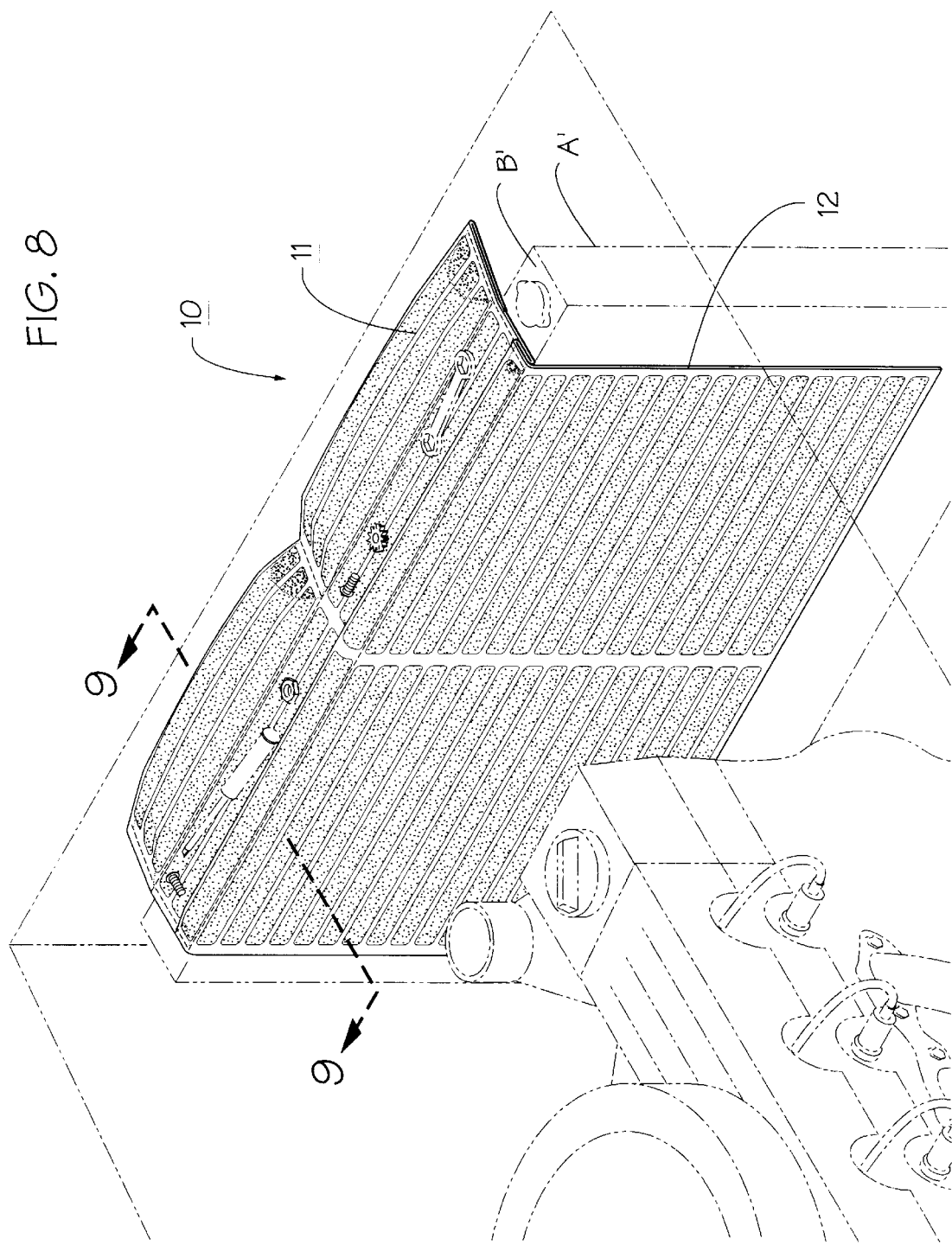
FIG. 8 is a fragmentary right side perspective similar to FIG. 6, but showing the cover thereof placed on a radiator thinner than the one shown in FIG. 6.

FIGS. 8 and 9 illustrates the use of protective radiator cover 10 on a radiator $A^1$ thinner than that shown in FIG. 6. In this application, part of the front portion of tubular weight holder pocket drapes downward and forward over the upper surface of radiator tank $B^1$.

Although the various seams of protective cover 10 were described above as being made by sewing, these seams could, of course, be formed in other ways, as for example, by ultrasonic, thermosonic or radio frequency welding.

What is claimed is:

1. A protective cover for motor vehicle radiators comprising;
   a. a first, front, tank section adapted to at least partially cover the upper, tank portion of a motor vehicle radiator, said front section including a tool storage area on the upper surface thereof,
   b. a second, rear, core section adapted to at least partially cover the lower, core portion of said motor vehicle radiator,
   c. hinge means hingedly joining said first and second cover sections, and
   d. retaining means for retaining said first, front cover section in a location fixed relative to said tank portion of said radiator.

2. The protective cover of claim 1 wherein said first, front, tank section is further defined as being made of a flexible material adapted to at least partially conform to the irregular upper surface of a motor vehicle radiator tank.

3. The protective cover of claim 1 wherein said retaining means is further defined as comprising weights incorporated into said front cover section.

4. The protective cover of claim 1 wherein said hinge means is further defined as being a transversely disposed flexible member.

5. The cover of claim 1 wherein said tool storage area is further defined as a tray-like region on said upper surface of said front section of said cover, said tray-like region having a rear side defined by a transversely disposed lip located longitudinally between the front peripheral edge of said front section and said rear section of said cover.

6. The cover of claim 5 further including a transversely disposed raised portion located proximate said front peripheral edge of said cover.

7. The protective cover of claim 1 wherein said front and rear sections thereof are formed from a unitary sheet of flexible material.

8. A protective cover for motor vehicle radiators comprising an elongated sheet of thin flexible material, said sheet having a generally rectangular shape, said sheet having near a front transverse peripheral edge thereof a weighted area comprising an elongated tubular section containing weights adapted to hold by the force of gravity a front portion of said sheet in place on the upper surface of the upper tank portion of a motor vehicle radiator, with a rear portion of said sheet draped downward over the heat exchanger core section of said radiator.

9. The protective cover of claim 8 further including a transversely disposed raised rib protruding upwards from the upper surface of said sheet, said rib being located rearward from said front peripheral edge of said sheet a distance approximating the depth of said radiator tank which said cover is intended to be used with, said raised rib serving to inhibit rearward movement towards said radiator core of tools which may be placed on said front portion of said cover.

10. The protective cover of claim 9 further including a transversely disposed raised portion located proximate said front peripheral edge of said front section of said sheet, said raised portion serving to inhibit forward movement towards said radiator core of said tools and forming between said rib a shelf or tray area for said tools.

11. The protective cover of claim 10 wherein said raised front portion of said sheet is coextensive with said weighted area thereof.

12. A protective cover for motor vehicle radiators comprising a generally rectangularly-shaped thin pad or mat made of material sufficiently thick to prevent penetration of said pad by tools or radiator structure in response to inadvertent impact by a tool or service personnel body parts, said pad having a relatively short transversely disposed front tank section adapted to fit over the top of a vehicle radiator tank, and a relatively long, rectangular-shaped rear core section adapted to drape downwards from said tank section over the heat exchanger core section of said radiator, said pad including retaining means for retaining said pad in a fixed position on said radiator, said radiating means comprising at least one weight-containing pocket formed from a transversely disposed front tubular section located proximate the front peripheral edge of said sheet and affixed to said tank section of said cover.

13. The protective cover of claim 12 further including a transversely disposed rib that protrudes upwards from the upper surface of said sheet, said rib being located proximate the junction line between said tank section and said core section of said cover, said rib forming between it and said front tubular weight section a shelf or tray area for storing tools.

14. The protective cover of claim 13 wherein said pad is formed from a unitary sheet of material, said sheet being rolled and seamed to form said weight pocket and said rib.

15. The protective cover of claim 14 wherein said sheet is further defined as having on at least one surface thereof friction enhancing areas.

16. The protective cover of claim 15 wherein said pad material is further defined as a thermal insulator.

* * * * *